US009583295B2

(12) United States Patent
Retzlaff

(10) Patent No.: US 9,583,295 B2
(45) Date of Patent: Feb. 28, 2017

(54) CIRCUIT BREAKER CONTACT ARM

(71) Applicant: ABB Technology AG, Zurich (CH)

(72) Inventor: Scott G. Retzlaff, Deltona, FL (US)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 14/615,930

(22) Filed: Feb. 6, 2015

(65) Prior Publication Data

US 2016/0233042 A1    Aug. 11, 2016

(51) Int. Cl.
| H01H 1/06 | (2006.01) |
| H01H 71/08 | (2006.01) |
| H01H 1/62 | (2006.01) |
| H02B 11/04 | (2006.01) |
| H01H 71/10 | (2006.01) |
| H01H 9/52 | (2006.01) |

(52) U.S. Cl.
CPC ............. H01H 71/08 (2013.01); H01H 1/62 (2013.01); H01H 71/10 (2013.01); H02B 11/04 (2013.01); H01H 9/52 (2013.01)

(58) Field of Classification Search
CPC ....... H01H 2009/523; H01H 9/52; H01H 1/62
USPC .................. 200/275, 289; 218/120, 140, 154
See application file for complete search history.

(56) References Cited

U.S. PATENT DOCUMENTS

| 5,929,410 | A | 7/1999 | Mun |
| 8,278,582 | B2 * | 10/2012 | Tu ..................... H01H 33/6606 |
| | | | 200/289 |
| 2013/0075238 | A1 | 3/2013 | Fischer-Carne et al. |
| 2015/0083558 | A1 * | 3/2015 | Malacara-Carrillo . H01H 1/023 |
| | | | 200/266 |

FOREIGN PATENT DOCUMENTS

| DE | 2238987 A1 | 2/1974 |
| WO | 2009/074016 A1 | 6/2009 |

OTHER PUBLICATIONS

Int. Search Report/Written Opinion cited in PCT Application No. PCT/US2016/016938 dated May 13, 2016, 19 pgs.

* cited by examiner

Primary Examiner — Vanessa Girardi
(74) Attorney, Agent, or Firm — Cooper Legal Group LLC

(57) ABSTRACT

A contact arm for a circuit breaker includes a body extending along a body axis between a first end and a second end. The body includes an interior surface, an exterior surface, and a fin extending between the interior surface and the exterior surface. The body defines a fin opening adjacent the fin. The fin opening extends between the interior surface and the exterior surface. The interior surface defines a substantially hollow interior. A body opening is located at the first end in fluid communication with the interior. Air flows through the body opening, into the interior, and from the interior out through the fin opening to reduce a temperature of the contact arm.

20 Claims, 4 Drawing Sheets

CIRCUIT BREAKER CONTACT ARM

BACKGROUND

A circuit breaker can comprise a contact arm through which electrical current can flow. Due to the relatively large magnitude of the electrical current (e.g., up to about 50 kilo-amps in some examples), a temperature of the contact arm can become high. To accommodate for these relatively large electrical currents and high temperatures, contact arms of a relatively large size have been provided.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

According to an aspect, a contact arm for a circuit breaker comprises a body extending along a body axis between a first end and a second end. The body comprises an interior surface, an exterior surface, and a fin extending between the interior surface and the exterior surface. The body defines a fin opening adjacent the fin. The fin opening extends between the interior surface and the exterior surface. The interior surface defines a substantially hollow interior and a body opening at the first end in fluid communication with the interior. Air flows through the body opening, into the interior, and from the interior out through the fin opening to reduce a temperature of the contact arm.

According to another aspect, a contact arm for a circuit breaker comprises a body extending along a body axis between a first end and a second end. The body comprises an interior surface defining a substantially hollow interior, and a body opening at the first end in fluid communication with the interior. Air flows through the body opening and into the interior. The body comprises a fastener opening at the second end. The body is configured to receive a fastener through the fastener opening to attach the contact arm to a terminal.

According to another aspect, a contact arm for a circuit breaker is provided. The contact arm comprises a body extending along a body axis between a first end and a second end. The body comprises an interior surface, an exterior surface, and a fin extending between the interior surface and the exterior surface. The body defines a fin opening adjacent the fin. The fin opening extends between the interior surface and the exterior surface.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

FIGURES

The application is illustrated by way of example and not limitation in the figures of the accompanying drawings, in which like references generally indicate similar elements and in which.

DESCRIPTION

Figure 1:
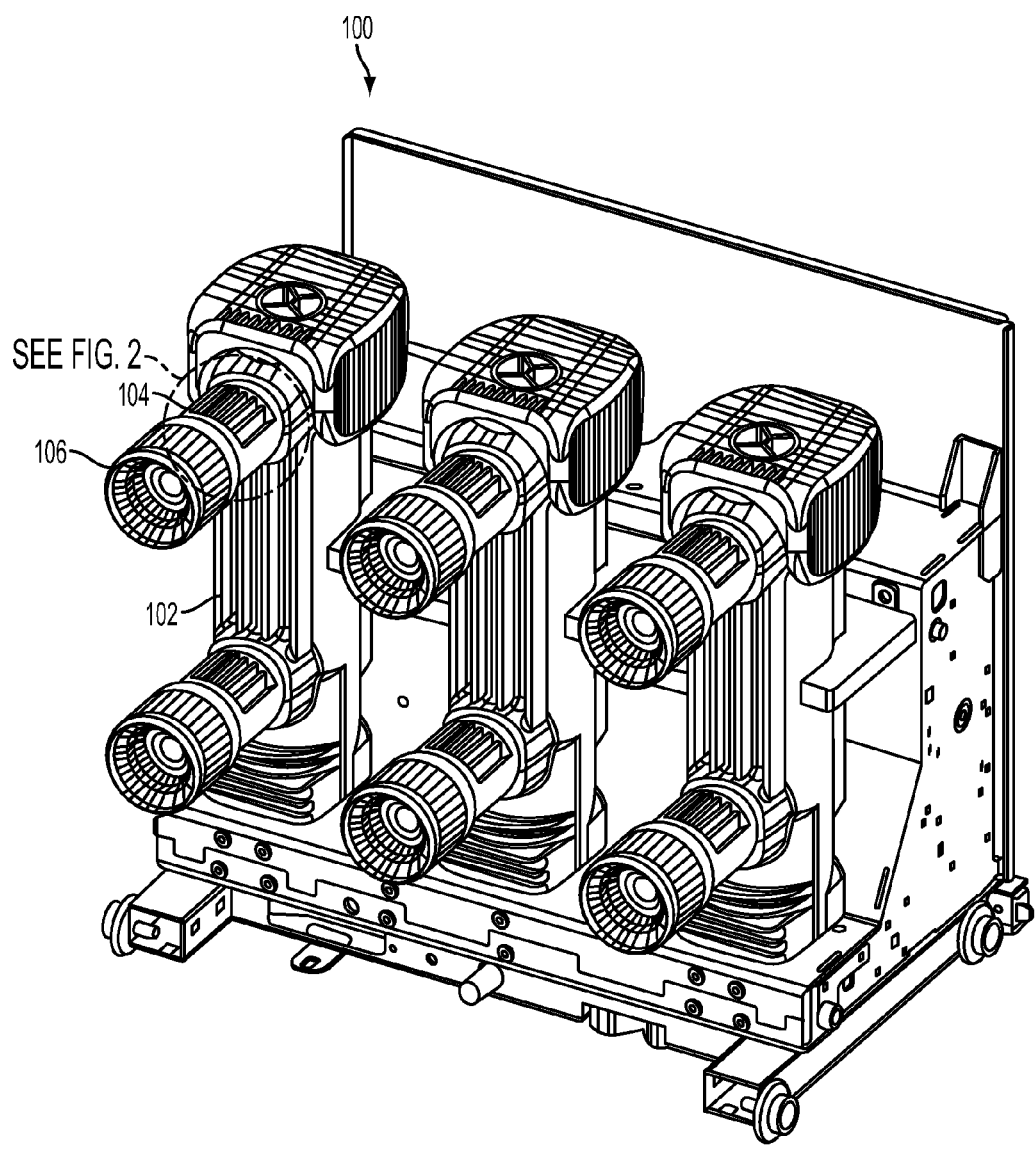
FIG. 1 illustrates an example portion of an example circuit breaker having an example contact arm.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

FIG. 1 is an illustration of a portion of an example circuit breaker 100. The circuit breaker 100 can function as an electrical switch to protect an electrical circuit from damage that may be caused by a short circuit, overload, etc. In some examples, the circuit breaker 100 can detect a fault condition and interrupt current flow to protect the electrical circuit from damage. In some examples, the circuit breaker 100 can be reset to resume normal operation after the occurrence of the fault condition. It will be appreciated that the portion of the circuit breaker 100 that is illustrated in FIG. 1 is not intended to be limiting. Rather, other structures, components, configurations, constructions, etc. are envisioned. As such, the portion of the circuit breaker 100 that is illustrated in FIG. 1 comprises merely one of any number of example circuit breakers 100.

The circuit breaker 100 can comprise one or more poles, such as a pole 102. In an example, the poles 102 can house an electrical conductor through which electrical current can flow. The poles 102 can comprise a terminal that is in electrical communication with the electrical conductor of the poles 102. The terminal can serve as a connection location at which one or more structures, components, etc. can be electrically connected to the electrical conductor of the poles 102.

The circuit breaker 100 can comprise a contact arm 104 that is electrically connected to a terminal of one of the poles 102. As will be described herein, the contact arm 104 comprises an electrically conductive material, such that electrical current can flow through the contact arm 104.

The circuit breaker 100 can comprise a finger cluster 106 that is electrically connected to the contact arm 104. In an example, electrical current can flow between the finger cluster 106 and the contact arm 104. In some examples, the finger cluster 106 defines a substantially hollow interior, such that air can flow through the finger cluster 106.

Figure 2:
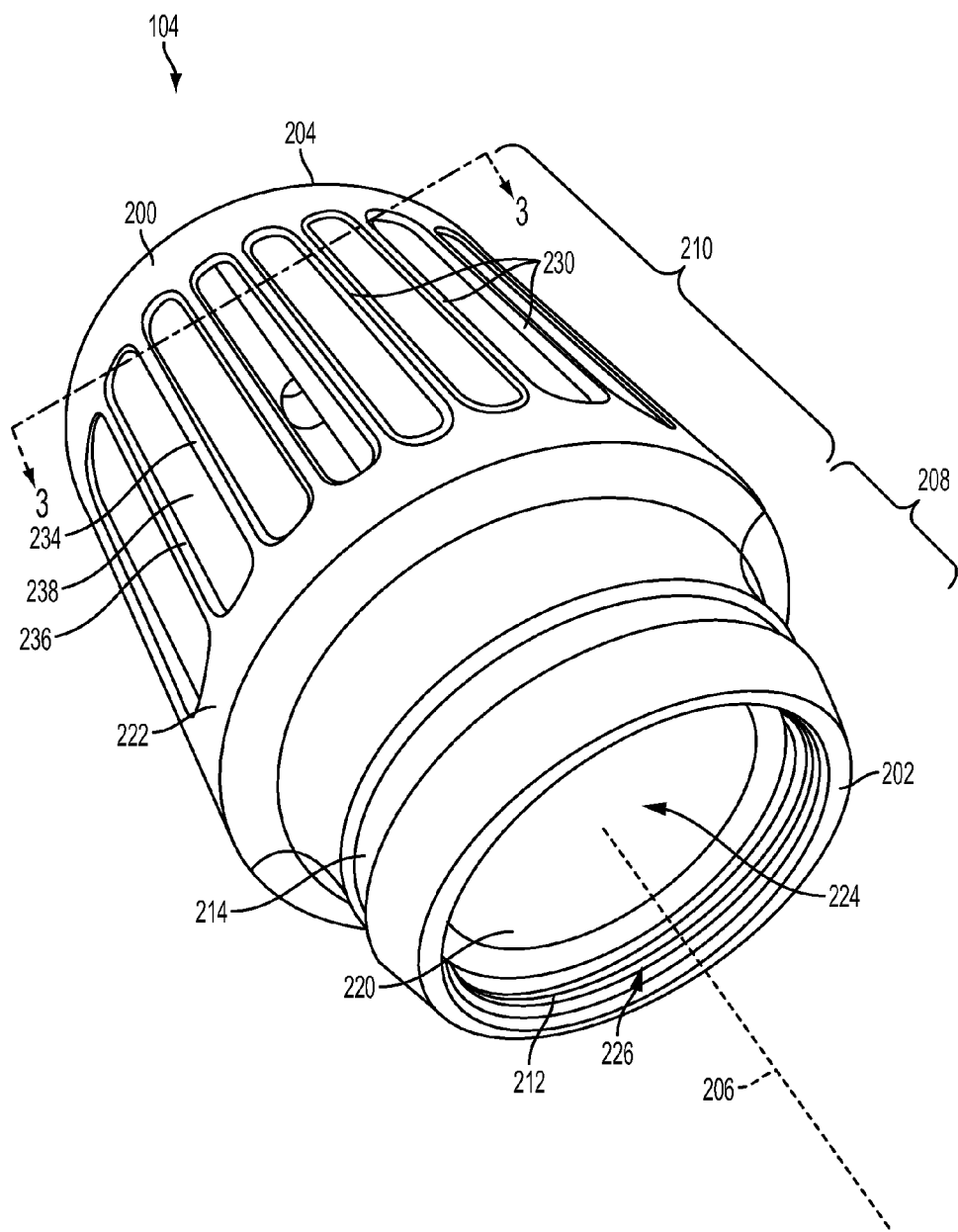
FIG. 2 illustrates an example contact arm having one or more fins.

Turning to FIG. 2, the contact arm 104 is illustrated. It will be appreciated that the contact arm 104 is illustrated as being separate from, detached from, etc. the pole 102 and the finger cluster 106 of FIG. 1 for illustrative purposes and to more clearly illustrate portions of the contact arm 104. In operation, the contact arm 104 can be positioned at a similar location as illustrated in FIG. 1.

The contact arm 104 comprises a body 200. The body 200 extends between a first end 202 and a second end 204. The body 200 can extend along a body axis 206. In some examples, the body 200 has a substantially cylindrical shape. The body 200 can comprise an electrically conductive material such that electrical current can flow through the contact arm 104. While any number of different materials are envisioned, in some examples, the body 200 comprises copper, silver, or the like.

In an example, the body 200 comprises a first body portion 208 and a second body portion 210. The first body portion 208 and the second body portion 210 can extend along the body axis 206. The first body portion 208 is located adjacent the first end 202 of the body 200. The second body portion 210 is located adjacent the second end 204 of the body 200. In this example, the first body portion 208 has a smaller cross-sectional size than the second body portion 210. In this example, the first body portion 208 can have a shorter length (e.g., axial length along the body axis 206) than the second body portion 210.

The first body portion 208 of the body 200 comprises a threaded portion 212. In this example, the threaded portion 212 is defined along an interior of the first body portion 208. The threaded portion 212 allows for attachment (e.g., a threaded attachment) to another structure, such as the finger cluster 106, in an example.

The first body portion 208 defines an attachment channel 214 along an exterior of the first body portion 208. The attachment channel 214 comprises a groove, furrow, indentation, etc. formed at the exterior of the first body portion 208. The attachment channel 214, along with the threaded portion 212, extends circumferentially around the first body portion 208. The attachment channel 214 is defined on opposing axial sides by walls, such that the attachment channel 214 projects into the first body portion 208. The attachment channel 214 allows for attachment to another structure (e.g., such as by receiving an outwardly projecting attachment structure), such as the finger cluster 106, in an example.

Figure 3:
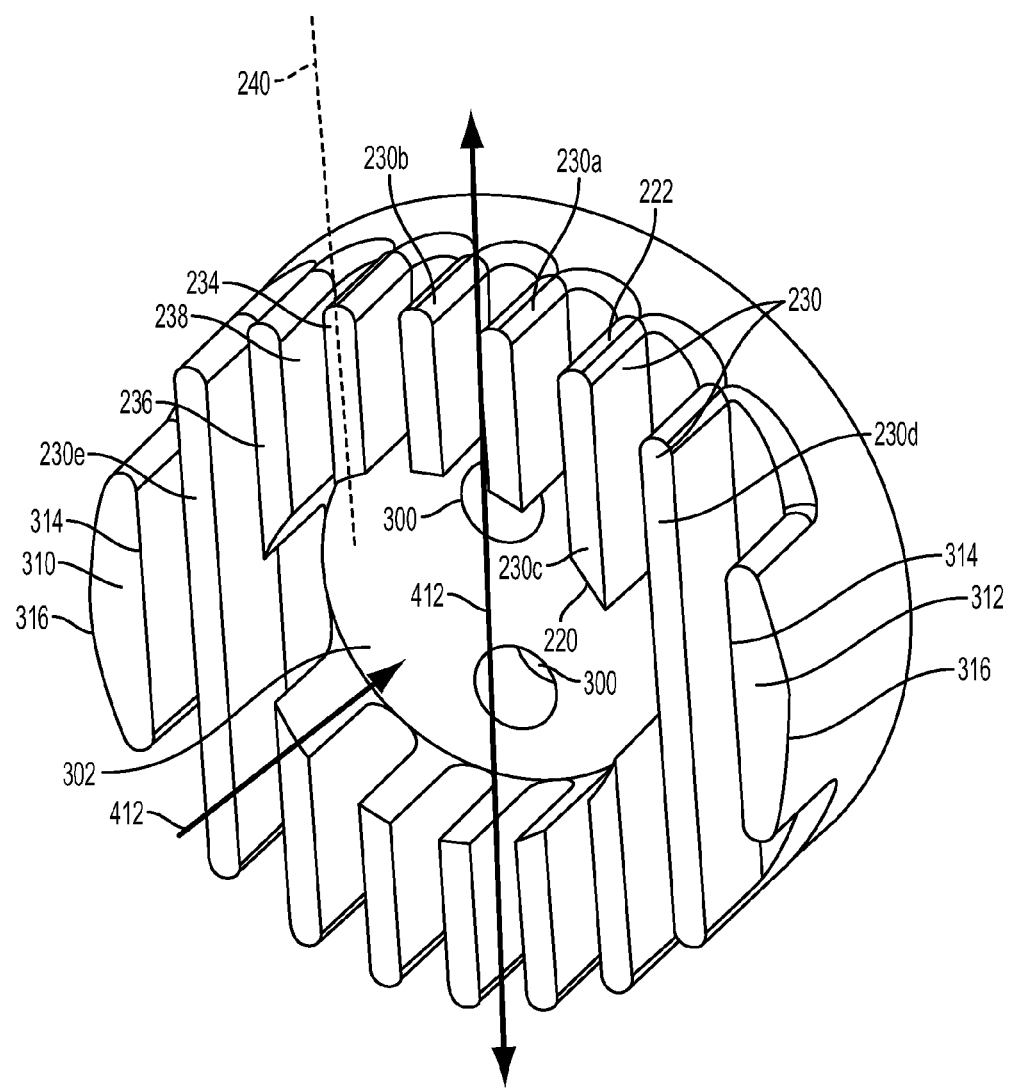
FIG. 3 illustrates a sectional view of an example contact arm of FIG. 2.

Referring to FIGS. 2 and 3, FIG. 3 illustrates a sectional view as viewed from the perspective indicated by lines 3-3 in FIG. 2. The body 200 comprises an interior surface 220 and an exterior surface 222. The interior surface 220 extends circumferentially around an interior of the body 200 (e.g., the first body portion 208 and the second body portion 210). The interior surface 220 can define a substantially hollow interior 224 of the body 200.

Figure 4:
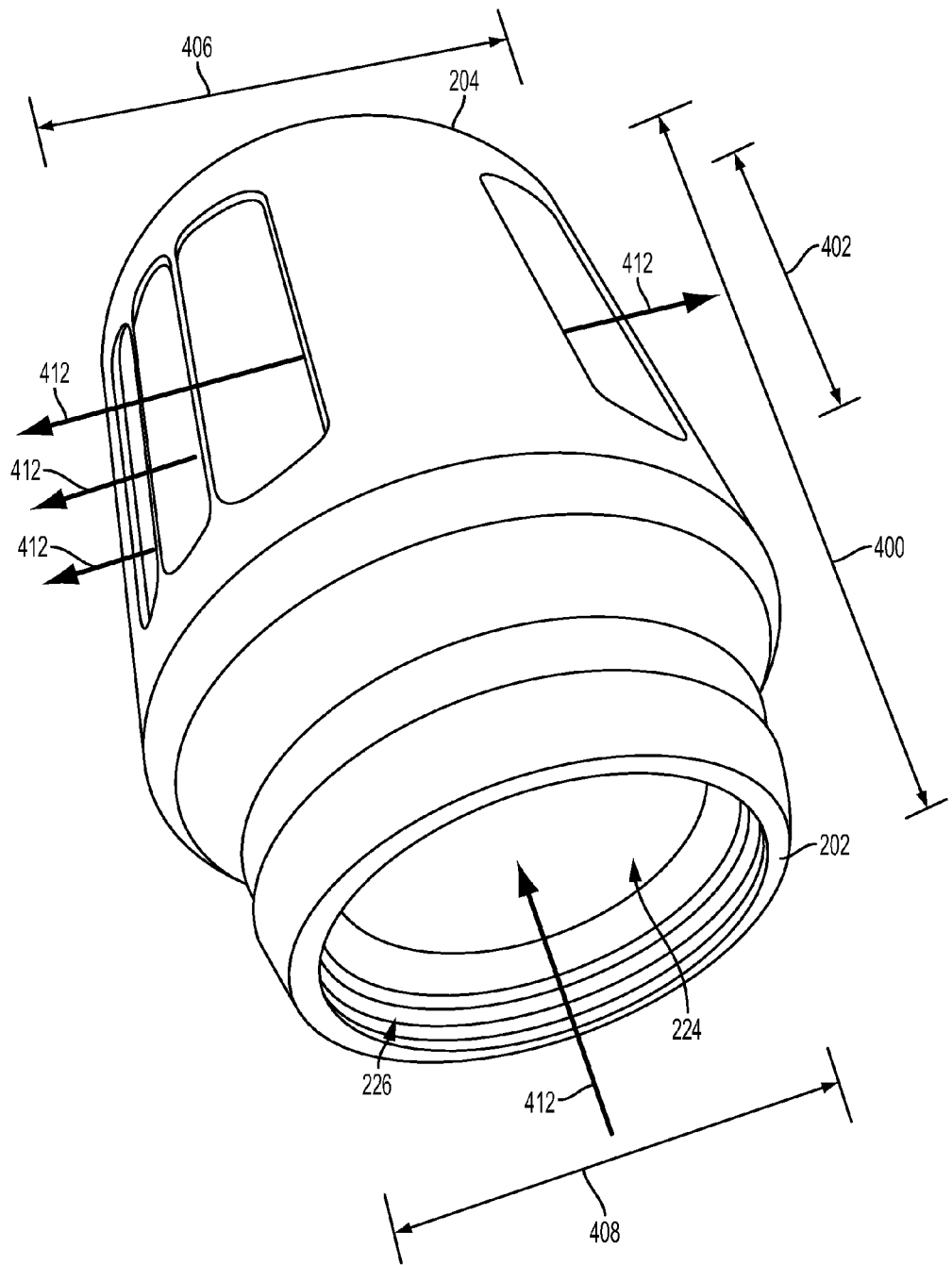
FIG. 4 illustrates an example contact arm with air flow through fin openings.

The interior surface 220 can define a body opening 226 at the first end 202 of the body 200. The body opening 226 is in fluid communication with the interior 224 of the body 200. As such, the body 200 can receive air flow (e.g., as illustrated in FIGS. 3 and 4) through the body opening 226 and into the interior 224. In this example, the body opening 226 is circumferentially bounded by the threaded portion 212.

The body 200 comprises a plurality of fins 230 extending between the interior surface 220 and the exterior surface 222. In this example, the plurality of fins 230 can extend along the body 200 in a direction that is substantially parallel to the body axis 206. For example, the plurality of fins 230 can extend lengthwise between the first end 202 and the second end 204 of the body 200. As such, the plurality of fins 230 can extend axially along the body 200. In this example, the plurality of fins 230 have a length that is less than a length of the body 200. That is, opposing ends of the plurality of fins 230 may not reach the first end 202 or the second end 204 of the body 200.

It will be appreciated, that the plurality of fins 230 are not limited to extending in a direction that is substantially parallel to the body axis 206. Rather, in another example, the plurality of fins 230 can extend non-parallel to the body axis 206. In a possible example, the plurality of fins 230 can extend circumferentially around the body 200. In another example, the plurality of fins 230 can extend helically around the body 200. Indeed, the plurality of fins 230 can extend in a variety of directions with respect to the body 200, some of which may be non-parallel to the body axis 206.

In an example, the plurality of fins 230 comprise a fin 234 and a second fin 236. In this example, the fin 234 and the second fin 236 can extend between the interior surface 220 and the exterior surface 222. The fin 234 and the second fin 236 can extend along the body 200 in a direction that is substantially parallel to the body axis 206. The second fin 236 can be spaced a distance apart from the fin 234 to define a fin opening 238 between the fin 234 and the second fin 236. In this example, the fin opening 238 can extend between the interior surface 220 and the exterior surface 222 so as to define a gap, a space, a hole, a channel, a void, etc. through the body 200. In this example, adjacent fins 230 can be separated by fin openings (e.g., fin opening 238). The fin openings 238 provide for an air flow path (e.g., air 412 illustrated in FIGS. 3 and 4) from the interior 224 of the body 200 to an exterior of the body 200.

The fin 234 can extend along a fin axis 240 between the interior surface 220 and the exterior surface 222. In this example, the fin axis 240 may not intersect with the body axis 206 of the body 200. For example, one or more of the plurality of fins 230 can extend non-radially between the interior surface 220 and the exterior surface 222. By extending non-radially, one or more of the plurality of fins 230 may not share a common center and, instead, may extend substantially parallel to each other. In this example, the fin 234 and the second fin 236 can extend substantially parallel to each other between the interior surface 220 and the exterior surface 222 while not intersecting with the body axis 206 of the body 200. In this example, the fin openings 238 that separate adjacent fins 230 (e.g., the fin 234 and the second fin 236, for example) can have a substantially constant width between the interior surface 220 and the exterior surface 222. In the illustrated example, the plurality of fins 230 extend along fin axes (e.g., fin axes 240) between the interior surface 220 and the exterior surface 222, with the fin axes substantially parallel to each other.

The plurality of fins 230 are not limited to extending substantially parallel to each other, as illustrated. Rather, in other examples, the plurality of fins 230 can extend radially between the interior surface 220 and the exterior surface 222. By extending radially, the plurality of fins 230 can share a common center, such as the body axis 206, such that the plurality of fins 230 could intersect with the body axis 206. In such an example, the plurality of fins 230 may still be separated by the fin openings 238 defined between adjacent fins 230. In such an example, the fin openings 238 that separate adjacent fins may not have a substantially constant width between the interior surface 220 and the exterior surface 222. Rather, the fin openings 238 can have an increasing width from the interior surface 220 towards the exterior surface 222.

Referring to FIG. 3, the interior surface 220 defines one or more fastener openings 300 at the second end 204 of the body 200. In an example, the one or more fastener openings 300 extend through a second end wall 302 at the second end 204 of the body 200. The second end wall 302 can define a plane that is substantially perpendicular to the body axis 206. In this example, the one or more fastener openings 300 extend from the interior 224 of the body 200, through the second end wall 302, and to the exterior of the body 200. While the second end wall 302 is illustrated as defining two fastener openings 300, it will be appreciated that any number of fastener openings 300 may be provided.

In an example, a body opening size of the body opening 226 is larger than a fastener opening size of the one or more fastener openings 300. The one or more fastener openings 300 can be sized and shaped to receive one or more fasteners. For example, one or more fasteners can be received through the one or more fastener openings 300, such that a first fastener can be received through a first fastener opening, a second fastener can be received through a second fastener opening, etc. In this example, the fasteners can be used to attach the body 200 to a terminal of the pole 102 (e.g., illustrated in FIG. 1). For example, the fasteners can pass through the one or more fastener opening 300 to be received within openings in the pole 102. As such, the second end 204 of the body 200 can be connected to the pole 102 such that the contact arm 104 is electrically connected to the terminal of the pole 102.

The body 200 can define one or more fin walls at opposing sides of the body 200. For example, a first fin wall 310 can be defined on one side of the body 200 while a second fin wall 312 can be defined on a diametrically opposed side of the body 200. In this example, the first fin wall 310 and the second fin wall 312 can have one side (e.g., an inner side 314) bounded by one of the fin openings 238. The first fin wall 310 and the second fin wall 312 can have an opposite side (e.g., an outer side 316) at least partially defining the exterior surface 222 of the body 200. As such, the inner side 314 of the first fin wall 310 and the second fin wall 312 can face towards the interior 224 of the body 200 while the outer side 316 of the first fin wall 310 and the second fin wall 312 can face towards an exterior of the body 200. The outer side 316 of the first fin wall 310 and the second fin wall 312 can have a rounded, semi-circular shape that matches the substantially cylindrical shape of the body 200.

In this example, the plurality of fins 230 can have a non-constant dimension/size (e.g., distance between the interior surface 220 and the exterior surface 222). For example, center fins 230a, 230b can have a shorter dimension/size between the interior surface 220 and the exterior surface 222 than outer fins (e.g., the second fin 236 and outer fin 230c). Outermost fins 230d, 230e that are bounded on both sides by the fin openings 238 can have a larger dimension/size than the center fins 230a, 230b and the outer fins (e.g., the second fin 236 and outer fin 230c).

Turning to FIG. 4, the first end 202 of the body 200 is illustrated. The body 200 can comprise a body length 400 that extends between the first end 202 and the second end 204. In some examples, the body length 400 can be between about 100 millimeters to about 150 millimeters. In this example, the fins 230 comprise a fin length 402 that can be between about 50 millimeters to about 75 millimeters. In another example, the fin length 402 is between about 60 millimeters to about 70 millimeters. The body 200 (e.g., the second body portion 210) comprises a cross-sectional size 406 that is between about 80 millimeters to about 100 millimeters. In an example, the body opening 226 has an opening cross-sectional size 408 that is between about 50 millimeters to about 60 millimeters.

The design of the contact arm 104, in particular the fins 230 and the body opening 226, can cause a reduction in temperature of the contact arm 104. By providing for this temperature reduction, overall dimensions (e.g., body length 400, cross-sectional size 406, etc.) of the contact arm 104 can be reduced. In operation, electrical current can flow through the contact arm 104. As a result of this current flow, a temperature of the contact arm 104 can increase. To assist in reducing this temperature, relatively cooler air (e.g., ambient air) 412 (e.g., as illustrated in FIGS. 3 and 4) can flow through the body opening 226 of the body 200. This cooler air 412, by flowing through the body opening 226, can enter the interior 224 of the body 200.

The cooler air 412 can flow from the interior 224 and out through the fin openings 238 between the plurality of fins 230. Through conduction and/or convection, the air 412 that flows through and exits the fin openings 238 can reduce a temperature of the fins 230 by drawing heat from the fins 230 through dissipation. As such, the air 412 can function to reduce the temperature of the contact arm 104 by flowing through the body opening 226, into the interior 224, and out through the fin openings 238.

The dimensions of the contact arm 104 are beneficial in a number of ways. For example, the opening cross-sectional size 408 of the body opening 226 is large enough to allow for a sufficient flow of air 412 through the body opening 226. Likewise, the cross-sectional size 406 of the body 200 allows for the air 412 to enter the interior 224 prior to exiting through the fin openings 238. The plurality of fins 230 have the fin length 402 that is large enough to increase a surface area of the plurality of fins 230, thus improving the heat dissipation of the plurality of fins 230. Additionally, the plurality of fins 230 are spaced apart a sufficient distance to define the fin openings 238 such that the air 412 can exit through the fin openings 238 while drawing heat from the plurality of fins 230.

For at least the reasons described herein, the contact arm 104 can allow for relatively large electrical currents to flow through the contact arm 104. In an example, a range of electrical currents that can flow through the contact arm 104 comprises between about 0 amps to about 4000 amps continuous and/or 0 amps to about 50 kilo-amps during certain time periods. To accommodate for these electrical currents and the associated heat rise, the contact arm 104 comprises the body opening 226, the plurality of fins 230, and the fin openings 238. As such, air 412 can flow through the contact arm 104 to remove heat and reduce a temperature of the contact arm 104. As such, drawbacks associated with a relatively high temperature of the contact arm 104 are reduced.

It will be appreciated that the contact arm 104 is not limited to the illustrated example of FIGS. 1 to 4. For example, the contact arm 104 is illustrated as comprising the substantially hollow interior 224 that is defined by the interior surface 220. In other examples, however, the contact arm 104 may not define the substantially hollow interior 224. Rather, the contact arm 104 may not have a hollow interior and, as such, may not have an interior surface. Instead, the plurality of fins 230 can extend substantially continuously through the body 220 between the exterior surface 222.

Referring briefly to FIG. 3, in such an example, the plurality of fins (e.g., the fins 230a, 230b, 230c, 230d, 230e, 234, 236) can extend between the exterior surface 222 (e.g., between an upper side and a lower side of the body 200) substantially continuously without the substantially hollow interior 224 located in the center. In such an example, the air 412 can flow through the fin openings 238, such as by entering the fin openings 238 from an exterior of the contact arm 104 from an upper side or a lower side of the body 200. This air 412 can flow through the fin openings 238 to reduce a temperature of the contact arm 104 in a similar manner as described above. In contrast to the example of FIG. 3 in which the air 412 can flow through the fin openings 238 from the substantially hollow interior 224 towards an exterior (e.g., from the interior surface 220 to the exterior surface 222), in this example, the air 412 can enter the fin openings 238 from the exterior to flow through the fin openings 238.

Additionally, it will be appreciated that while the contact arm 104 is described herein as being electrically conductive, not all portions, parts, pieces, etc. of the contact arm 104 need be electrically conductive. In a possible example, less than all of the plurality of fins 230 may be electrically conductive.

As used in this application, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first component and a second component generally correspond to component A and component B or two different or two identical components or the same component.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A contact arm for a circuit breaker, the contact arm comprising:
    a body extending along a body axis between a first end and a second end, the body comprising:
        an interior surface;
        an exterior surface; and
        a fin extending between the interior surface and the exterior surface, where the body defines a fin opening adjacent the fin, the fin opening extending between the interior surface and the exterior surface, wherein the fin is comprised as a plurality of fins extending between the interior surface and the exterior surface, the plurality of fins extending in a direction that is substantially parallel to the body axis, and wherein the plurality of fins extend along fin axes between the interior surface and the exterior surface, the fin axes substantially parallel to each other.

2. The contact arm of claim 1, wherein the plurality of fins comprise a second fin extending in a direction that is substantially parallel to the body axis.

3. A contact arm for a circuit breaker, the contact arm comprising:
    a body extending along a body axis between a first end and a second end, the body comprising:
        an interior surface defining:
            a substantially hollow interior, wherein a distance between the body axis and the interior surface is substantially constant about a circumference of the interior surface;
            a body opening at the first end in fluid communication with the interior, where air flows through the body opening and into the interior; and
            a fastener opening at the second end, the body configured to receive a fastener through the fastener opening to attach the contact arm to a terminal.

4. The contact arm of claim 3, wherein the body opening has a body opening size that is larger than a fastener opening size of the fastener opening.

5. The contact arm of claim 3, wherein the body comprises a body length between the first end and the second end, the body length between 100 millimeters to 150 millimeters.

6. The contact arm of claim 3, wherein the body comprises a cross-sectional size that is between 80 millimeters to 100 millimeters.

7. The contact arm of claim 3, wherein the body comprises an electrically conductive material such that electrical current flows through the contact arm.

8. A contact arm for a circuit breaker, the contact arm comprising:
    a body extending along a body axis between a first end and a second end, the body comprising:
        an interior surface;
        an exterior surface;
        a fin extending between the interior surface and the exterior surface, where the body defines a fin opening adjacent the fin, the fin opening extending between the interior surface and the exterior surface, wherein the fin extends along a fin axis between the interior surface and the exterior surface, and
        a second fin extending between the interior surface and the exterior surface, where the body defines a second fin opening adjacent the second fin, the second fin opening extending between the interior surface and the exterior surface, wherein the second fin extends along a second fin axis between the interior surface and the exterior surface, the fin axis and the second fin axis substantially parallel to each other;
        the interior surface defining:
            a substantially hollow interior; and
            a body opening at the first end in fluid communication with the interior, where air flows through the body opening, into the interior, and from the interior out through the fin opening and the second fin opening to reduce a temperature of the contact arm.

9. The contact arm of claim 8, wherein the fin and the second fin extend in a direction that is substantially parallel to the body axis.

10. The contact arm of claim 8, wherein the fin and the second fin are comprised as a plurality of fins extending between the interior surface and the exterior surface.

11. The contact arm of claim 8, wherein the fin axis does not intersect with the body axis.

12. The contact arm of claim 8, wherein the interior surface defines a fastener opening at the second end, the body configured to receive a fastener through the fastener opening to attach the contact arm to a terminal.

13. The contact arm of claim 8, wherein the body comprises a body length between the first end and the second end, the body length between 100 millimeters to 150 millimeters.

14. The contact arm of claim 8, wherein the body comprises a cross-sectional size that is between 80 millimeters to 100 millimeters.

15. The contact arm of claim 8, wherein the body comprises an electrically conductive material such that electrical current flows through the contact arm.

16. The contact arm of claim 8, wherein a distance between the body axis and the interior surface is substantially constant about a circumference of the interior surface.

17. The contact arm of claim 8, wherein a radial distance between the interior surface and the exterior surface along a radial axis that intersects with the body axis is substantially constant about a circumference of the body.

18. The contact arm of claim 8, wherein the second fin axis intersects with the body axis.

19. The contact arm of claim 8, wherein the second fin is spaced a distance apart from the fin to define the fin opening between the fin and the second fin.

20. The contact arm of claim 19, wherein the distance between the second fin and the fin is greater than a thickness of the second fin.

\* \* \* \* \*